UNITED STATES PATENT OFFICE.

HARRISON B. MEECH, OF FORT EDWARD, NEW YORK.

IMPROVEMENT IN THE MANUFACTURE OF PAPER-PULP.

Specification forming part of Letters Patent No. 54,932, dated May 22, 1866.

*To all whom it may concern:*

Be it known that I, HARRISON B. MEECH, of Fort Edward, in the county of Washington and State of New York, have invented a new and Improved Process for the Manufacture of Manila Paper from Grasses for Bags, Wrapping-Paper, and other purposes for which coarse paper may be used.

The object of my said invention is to prepare hay, hemp, flax, and particularly prairie grasses for the manufacture of Manila paper and wrapping-paper in a manner most economical as to time employed and expense of material used, as well as producing a superior quality of stock, so that in all the aforesaid respects there may be the greatest economy secured and the best results obtained.

To enable others to construct and use my said invention and improvements, I now proceed to describe particularly the construction, operation, and use of the same.

In the first place, the hay, hemp, flax, and prairie grasses should be gathered after they become ripe; then they should be cut from two to four inches in length, for the purpose of having the fibers more even, also for the purpose of packing it into the boilers, so that it can be evenly acted upon by the liquor within the rotary boilers; then the grasses, &c., are packed into the boilers and cooked with high temperature in a suitable liquor. The fibers will become softened and separated from each other. The rotary boilers for this purpose should be inclosed in an arch.

The compound that I use in the foregoing process is composed of water, lime, soda-ash, and salt in the following proportions: To one hundred pounds of hay, hemp, &c., I use from ten to fifteen per cent. of lime and from three to five per cent. of soda-ash, also from two to five per cent. of common salt. To these I add about fifty gallons of water to one hundred pounds of stock to be acted upon.

The proportion may be varied according to the quality of paper it is desired to make.

In mixing my liquor I use a tub or iron pan that will hold about fifteen hundred gallons of water, with an agitator within to agitate the liquor. I then use an iron basket perforated with holes, and hang it in the tub or pan. Then I slaken the lime through this basket, so that no stones or gravel will be mixed with the liquor. Then I mix the soda-ash and salt in the same way.

Before applying the liquor to the stock it should be well agitated, so that the fine lime or the milky substance of the lime will be applied to the stock, instead of using the liquor clear. Then I put a fire underneath the boiler, and boil from three to six hours with from thirty to one hundred and fifty pounds internal pressure to the square inch. After this is boiled or cooked sufficiently the mass is emptied into a vat or tub and drained and washed. Then the mass is beaten and ground in the manner well known to paper-makers.

Having thus fully described my invention, what I claim as new, and desire to secure by Letters Patent, is—

1. The method of treating hay, hemp, flax, and other grasses for the manufacture of paper, substantially as described.

2. Using liquors in a rotary boiler prepared in the manner and for the purpose herein set forth.

HARRISON B. MEECH.

Witnesses:
 CHARLES HERRON,
 E. L. NORFOLK.